United States Patent
Nakamura et al.

[11] Patent Number: 6,153,127
[45] Date of Patent: Nov. 28, 2000

[54] OPTICAL THIN FILM, FORMING COMPOSITION THEREOF, AND ULTRAVIOLET RAY ABSORBING AND THERMIC RAY REFLECTING GLASS USING THE SAME

[75] Inventors: Koichiro Nakamura; Koichi Maeda, both of Osaka-fu, Japan

[73] Assignee: Nippon Sheet Glass Co., Ltd., Japan

[21] Appl. No.: 09/125,763

[22] PCT Filed: Dec. 25, 1997

[86] PCT No.: PCT/JP97/04812

§ 371 Date: Dec. 21, 1998

§ 102(e) Date: Dec. 21, 1998

[87] PCT Pub. No.: WO98/29352

PCT Pub. Date: Sep. 7, 1998

[30] Foreign Application Priority Data

Dec. 25, 1996 [JP] Japan ..................... 8-344799

[51] Int. Cl.[7] .............. F21V 9/04; C03C 3/12; B23B 9/00
[52] U.S. Cl. .................. 252/588; 252/584; 501/41; 501/51; 501/46; 501/72; 501/73; 501/905; 428/697; 428/432
[58] Field of Search ................. 252/582, 584, 252/588; 359/885; 501/41, 51, 46, 72, 73, 905; 428/697, 432

[56] References Cited

U.S. PATENT DOCUMENTS 4,721,690  1/1988  Ross et al. .................. 501/905
5,976,678  11/1999 Kawazu et al. .................. 501/905

FOREIGN PATENT DOCUMENTS 3125299  6/1982  Germany.

OTHER PUBLICATIONS

Patent Abstracts of Japan, Publication No. 06345488A (1994).
Patent Abstracts of Japan, 4–177204 (A) (1992).
Patent Abstracts of Japan, Publication No. 08104544A (1996).
A. Makishima et al., *J. Am. Ceram. Soc.*, 69(6):C127–C129 (1986).

*Primary Examiner*—Philip Tucker
*Attorney, Agent, or Firm*—David G. Conlin; Christine C. O'Day; Edwards & Angell, LLP

[57] ABSTRACT

The present invention relates to an optical thin film containing titanium oxide, cerium oxide and bismuth oxide, wherein the content ratio of the titanium oxide, cerium oxide, and bismuth oxide is within the area expressed by four-cornered shape ABCD consisting of A (4,1,95), B (98,1,1), C (20,79,1), and D (3,14,83) in term of coordinate points ($TiO_2$ mol percent, $CeO_2$ mol percent, and $Bi_2O_3$ mol percent) of the mol ratio when being converted to oxides of $TiO_2$, $CeO_2$, and $Bi_2O_3$. Furthermore, with the invention, a comparatively high refractive index film layer and a comparatively low refractive index film layer are alternately laminated at least three layers on a transparent glass substrate, at least two layers of said three layers are high refractive index films, and at least one layer of said high refractive index films is said optical thin film.

12 Claims, 1 Drawing Sheet

A to L: Ratio area of three constituents ($TiO_2$, $Bi_2O_3$, $CeO_2$)
1 to 12: Embodiments 1 to 12
Comparison 1 and 2: Comparison examples 1 and 2

A to L: Ratio area of three constituents ($TiO_2$, $Bi_2O_3$, $CeO_2$)
1 to 12: Embodiments 1 to 12
Comparison 1 and 2: Comparison examples 1 and 2

OPTICAL THIN FILM, FORMING COMPOSITION THEREOF, AND ULTRAVIOLET RAY ABSORBING AND THERMIC RAY REFLECTING GLASS USING THE SAME

FIELD OF THE INVENTION

The present invention relates to an optical thin film, in particular a high refractive index film suitable for giving a transparent glass substrate ultraviolet ray absorbing and thermic ray reflecting features by covering the transparent glass substrate surface with the same, and a covering composition for forming the high refractive index film, and ultraviolet ray absorbing and thermic ray reflecting glass using the high refractive index film.

BACKGROUND OF THE INVENTION

Recently, a request has been increased in order to develop excellent ultraviolet ray and thermic ray shut-off glass which is able to prevent interiors from being deteriorated and getting sunburnt, to lessen a sense of heat, and to decrease the load of air conditioner, by shutting off ultraviolet rays and thermic rays of sunlight which flows into a compartment of automobile, etc., rooms of house, office, etc. In order to achieve such a request, ultraviolet ray absorbing and thermic ray reflecting glass having a high refractive index layer and a low refractive index layer, which have a ultraviolet ray absorbing power, alternately laminated on the surface of glass, and ultraviolet ray absorbing and thermic ray reflecting glass which allows visible light beams to pass through and is able to selectively reflect the thermic rays have been developed.

In order to use the abovementioned ultraviolet ray absorbing and thermic reflecting glass as a window shield for automobile for which the lower limit of visible light beam transmittance is defined to be 70%, it is necessary to increase the reflection index of only the thermic ray area without decreasing the transmittance of visible light beams. For this reason, there are some methods for high refractive index layer and low refractive index layer, one of which is a method of increasing the number of interfaces (number of times of lamination), and the other of which is a method of increasing the difference between the refractive index of the high refractive index layer and that of the low refractive index layer.

For example, Japanese laid-open patent publication No. 345488 of 1994 discloses thermic ray reflecting glass composed of two layers of high refractive index layer and low refractive index layer, which is covered with a thermic ray reflecting layer. The low refractive index layer described therein has a refractive index which is the middle between the glass substrate and the high refractive index layer. It can not be said that the thermic ray reflecting performance is sufficient since the thermic ray reflecting glass has two layers and the low refractive index layer thereof has a middle refractive index.

Furthermore, Japanese laid-open patent publication No. 177204 of 1992 discloses a ultraviolet ray and infrared ray cut filter, and Japanese laid-open patent publication No. 104544 of 1996 discloses thermic ray reflecting and ultraviolet ray absorbing glass and a method for producing the same. High refractive index film used for thermic ray reflecting glass disclosed in these publications employs a ultraviolet ray absorbing film mainly composed of cerium oxide or cerium oxide and titanium oxide as described in a literature [Akio Makishima, et al., J. Am. Ceram. Soc., 69[6]C-127-C-129 (1986)]. A film is composed so as to have a combination ratio of cerium oxide and titanium oxide so that the ultraviolet ray absorbing power can be displayed.

Furthermore, Japanese laid-open patent publication No. 239244 of 1996 describes ultraviolet ray absorbing glass which is composed of three layers of high refractive index layer, low refractive index layer and high refractive index layer, each layer having an optical film thickness from 170 nm to 400 nm, wherein it is disclosed that one layer of the two high refractive index layers consisting of titanium oxide is caused to contain cerium oxide, preferably to have a ratio by weight of cerium oxide to titanium oxide, which is 0.1 to 5.0.

Furthermore, Japanese laid-open patent publication No. 281023 of 1995 describes a high refractive index film containing titanium oxide and bismuth oxide and an incandescent lamp bulb having infrared ray reflecting film using the same.

However, in the abovementioned ultraviolet ray and infrared ray cut filter (Japanese laid-open patent publication No. 177204 of 1992), thermic ray reflecting and ultraviolet ray absorbing glass (Japanese laid-open patent publication No. 104544 of 1996), and ultraviolet ray absorbing glass (Japanese laid-open patent publication No. 239244 of 1996), the thermic ray reflecting performance was not fully displayed to the maximum. Furthermore, with a high refractive index film employed for the abovementioned incandescent lamp bulb having an infrared ray reflecting film (Japanese laid-open patent publication No. 281023 of 1995), sufficient ultraviolet ray absorbing power could not be displayed.

The present invention was developed in order to solve these conventional shortcomings and problems, and it is therefore an object of the invention to provide an optical thin film having a comparatively high refractive index in order to heighten the thermic ray reflection selecting performance and having a ultraviolet ray absorbing performance and ultraviolet ray absorbing and thermic ray reflecting glass using the same.

DISCLOSURE OF THE INVENTION

The invention relates to an optical thin film containing titanium oxide, cerium oxide and bismuth oxide.

Hereinafter, a detailed description is given of the invention.

An optical thin film having a comparatively high refractive index according to the invention contains titanium oxide, cerium oxide and bismuth oxide. Titanium oxide is effective to increase the refractive index of thin film and to give a ultraviolet ray absorbing performance to the optical thin film, cerium oxide is effective to give a ultraviolet ray absorbing performance to the abovementioned optical thin film. If the ratio of cerium oxide in the thin film is too small, no effect of absorbing ultraviolet rays can be recognized. To the contrary, if the ratio of cerium oxide is too large, the refractive index will be lowered. Therefore, with respect to the ratio of content of titanium oxide and cerium oxide in the thin film, it is necessary that the ratio $CeO_2/(TiO_2+CeO_2)$ of $CeO_2$ to the total of $TiO_2$ and $CeO_2$ is 0.99 to 80% in term of mol ratio where the oxidation state thereof is assumed to be $TiO_2$ and $CeO_2$, more preferably, the ratio is 20 to 60%, and still further preferably the ratio is 30 to 50%.

Furthermore, it is possible to increase the refractive index by causing bismuth oxide to co-exist in a thin film containing titanium oxide and cerium oxide. Although there is an effect to increase the refractive index even if the ratio of bismuth oxide in the thin film is very small, the effect of absorbing ultraviolet rays is decreased since the ratio of titanium oxide and cerium oxide is relatively decreased if the same is added too much. Therefore, with respect to the ratio of titanium oxide and bismuth oxide in the thin film, it is necessary that the ratio, $Bi_2O_3/(TiO_2+Bi_2O_3)$, of $Bi_2O_3$ to the total of $TiO_2$ and $Bi_2O_3$ is 1 to 96% in term of mol ratio of $TiO_2$ and $Bi_2O_3$ where the oxidation state of bismuth is assumed to be $Bi_2O_3$, more preferably the ratio is 4 to 60%, and still further preferably the ratio is 4 to 50%.

Therefore, it is necessary that the ratio of content of titanium oxide, cerium oxide, bismuth oxide in an optical thin film having a comparatively high refractive index and ultraviolet ray absorption according to the invention is a ratio within the area expressed by four-cornered shape ABCD consisting of A (4,1,95), B (98,1,1), C (20,79,1), and D (3,14,83) where in the three element composition of $TiO_2$—$CeO_2$—$Bi_2O_3$, the mol ratio of each of $TiO_2$, $CeO_2$, and $Bi_2O_3$ is expressed by coordinate points ($TiO_2$ mol percent, $CeO_2$ mol percent, and $Bi_2O_3$ mol percent) as shown in a graph of FIG. 1, more preferably a ratio within the area of four-cornered shape EFGH consisting of E (36,9,55), F (77,20,3), G (39,59,2), and H (24,38,38), and still further preferably a ratio within the area of four-cornered shape IJKL consisting of I (54,23,23), J (68,29,3), K (49,48.5,2) and L (39,39,22). The area of four-cornered shape IJKL is the most preferable since therein the refractive index of the thin film is increased, ultraviolet ray absorbing performance is given to the thin film, and there is a little possibility that the thin film is whitened.

Although the refractive index of thin film of titanium oxide and cerium oxide having ultraviolet ray absorbing performance depends on the heating temperature for forming a thin film, it is possible to increase the refractive index in a range from 0.01 to 1.00 by causing the thin film to contain bismuth oxide in a case of a thin film obtained by the same burning conditions.

Although an optical thin film, which is a thin film obtained by the same burning conditions, consisting of $TiO_2$, 60 percent by mol and $CeO_2$, 40 percent by mol, and having ultraviolet ray absorbing performance, has, for example, a refractive index of 1.99 with respect to wavelength of 550 nm, it is possible to obtain an optical thin film having ultraviolet ray absorbing performance and a high refractive index from 2.00 to 2.35 (wavelength 550 nm) according to the invention which contains bismuth oxide. And an optical thin film according to the invention usually has a geometrical thickness from 50 to 500 nm.

An optical thin film according to the invention contains titanium oxide, cerium oxide, and bismuth oxide. However, unless the refractive index and ultraviolet ray absorbing performance are remarkably lowered, the optical thin film may contain a bit of constituents for example, zirconium oxide, tantalum oxide, niobium oxide, tungsten oxide, antimony oxide, silicon oxide, etc., other than the abovementioned constituents, for example, 10 or less percent by mol in the total thereof.

With thermic ray reflecting glass obtained by causing a comparatively high refractive index layer and a comparatively low refractive index layer to be alternately laminated to be at least three-layered on a transparent glass substrate, ultraviolet ray absorbing and thermic ray reflecting glass can be obtained by making at least one layer of the abovementioned high refractive index layers an optical thin film having the abovementioned ultraviolet absorbing performance and high refractive index. It is preferable that at least two layers of the abovementioned three layers are of high refractive index layer. Furthermore, it is further preferable that the ultraviolet ray absorbing performance and thermic ray reflecting performance can be further improved by making all of the abovementioned high refractive index layers an optical thin film having the abovementioned ultraviolet ray absorbing performance and high refractive index.

With respect to the number of layers of the abovementioned high refractive index film and low refractive index film, the more is the better since the refractive index of the set wavelength can be increased if the number of layers is large. However, since, if the number of layers is increased, cracks and pin holes are generated by burning to cause the film strength to be lowered, and/or the production cost is increased as the number of times of coating is increased, it is preferable in this point of view that the number of layers is 7 or less, more preferably 5 or less, or still further, three layers are the most preferable.

With respect to the order of laminating a comparatively high refractive index film and a comparatively low refractive index film, a high refractive index layer may be firstly laminated on a transparent substrate, and a low refractive index film may be laminated thereon, and they may be laminated in the reversed order thereof. However, in view of heightening the reflection index in the core wavelength of thermic rays (infrared rays) to be set, it is preferable that the number of times of lamination is odd, wherein the uppermost layer or the lowermost layer is a high refractive index film layer. In this case, in a case where the number of times of lamination is three, since it is necessary to provide at least two layers of high refractive index film, a high refractive index film must be firstly formed on a transparent substrate. However, in a case where the number of times of lamination is even, the optical thin film thickness of a low refractive index film at the lowermost layer or the uppermost layer may be one-eighth of the set wavelength to cause the tone of color to be stabilized.

It is preferable that the abovementioned high refractive index film has a wavelength of one-fourth of light (thermic rays) having a wavelength from 680 nm to 2000 nm, that is, an optical film thickness from 170 nm to 500 nm, and further preferable that the film has a one-fourth wavelength of light having a wavelength from 700 nm to 3200 nm, that is, an optical thin film from 175 nm to 300 nm, whereby it is possible to increase the reflection index of a thermic ray area without greatly reducing the transmittance of visible light beams from the transmittance of transparent substrate itself. Furthermore, the abovementioned low refractive index film may be acceptable if the refractive index thereof is smaller than that of the abovementioned high refractive index film. However, in order to increase the reflection performance of thermic rays in a case where high refractive index film according to the invention and the abovementioned low refractive index film are alternately laminated, it is preferable that the refractive index of the low refractive index film is equivalent to or smaller than the refractive index of a transparent substrate. Float glass used as a transparent substrate usually has a refractive index of about 1.5. A substance having, for example, a refractive index of 1.5 or less, for example a film exclusively or mainly composed of silica, which has a refractive index of 1.46 (with respect to light having a wavelength from 460 nm to 850 nm), may be preferably used as a low refractive index film, and it is preferable that the substance has a ¼ wavelength of thermic rays, that is, an optical thin film from 170 nm to 500 nm as well as an optical thin film of high refractive index film, and further preferable that the substance has a ¼ wavelength of a wavelength from 700 nm to 1200 nm, that is, an optical thin film from 175 nm to 300 nm.

By thus using a substance having a very high refractive index as a high refractive index film and making the optical thin film of high refractive index film and optical thin film of low refractive index film equivalent to a value of ¼ wavelength of thermic rays, it is possible to selectively increase the reflection index of the thermic ray area, and to maintain the transmittance of visible light beams around a value closer to the transmittance of transparent substance.

A spatter method, CVD method may be employed to form a high refractive index film and a low refractive index film according to the invention. However, a sol-gel method is further preferable in view of the cost. A spin coating method, dip coating method, flow coating method, roll coating method, gravure coating method, flexoprinting method, screen printing method, etc. may be used with respect to the coating by a sol-gel method.

A coating liquid composition by the sol-gel method used to form a high refractive index film according to the invention consists of a titanium compound, a cerium compound, a bismuth compound and a solvent and is obtained by blending a titanium compound, a cerium compound, a bismuth compound with an organic solvent. Titanium alkoxide, titanium alkoxide chloride, titanium chelate, etc. may be used as a titanium compound. Titanium methoxide, titanium ethoxide, titanium n-propoxide, titanium n-buthoxide, titanium isobuthoxide, titanium methoxypropoxide, titanium stearloxide, titanium 2-ethylhexyoxide, etc. may be listed as titanium alkoxide. Titanium chloridetriisopropoxide, titanium dichloridediethoxide, etc. may be listed as titanium alkoxide chloride. Titanium triisopropoxide (2,4-pentanedionate), titanium diisopropoxide (bis-2,4-pentanedionate), titanium aryl acetate triisopropoxide, titanium bis (triethanol amine) diisopropoxide, titanium di-n-buthoxide (bis-2, 4-pentanedionate), etc. may be listed as titanium chelate. Cerium nitrate 6 hydrate, cerium chloride, cerium isopropoxide, cerium t-buthoxide, cerium methoxy ethoxide, etc. may be listed as a cerium compound. Bismuth nitrate, bismuth acetate, bismuth oxyacetate, bismuth chloride, bismuth hexafluoropentanedionate, bismuth t-pentoxide, bismuth tetramethyl heptanedionate, etc. may be listed as a bismuth compound.

In a case where titanium compound, cerium compound and bismuth compound are respectively calculated as if they are converted to $TiO_2$, $CeO_2$ and $Bi_2O_3$, and they are expressed by coordinate points ($TiO_2$, percent by mol, $CeO_2$, percent by mol, and $Bi_2O_3$, percent by mol) of mol ratio where they are calculated as if they are converted to their oxides, the titanium compound, cerium compound, bismuth compound are contained in the abovementioned composition of coating liquid so that their mol ratio becomes a ratio which enters an area of four-cornered shape ABCD consisting of A (4,1,95), B (98,1,1), C (20,79,1), and D (3,14,83), more preferably an area of four-cornered shape EFGH consisting of E (36,9,55), F (77, 20,3), G (39, 59, 2) and H (24, 38, 38), and further preferably an area of four-cornered shape IJKL consisting of I (54,23,23), J (68,29,3), K (49, 48.5,2), and L (39,39,22). The area of four-cornered shape IJKL is the most preferable in that the characteristics of film are excellent, the service life of the coating liquid composition is long and the coating liquid can be stored for a longer period.

A coating liquid composition by a sol-gel method used to form a comparatively low refractive index film according to the invention consists of a silicate compound and a solvent. As this composition, such which silicon alkoxide is blended with a solvent such as alcohol and is hydrolyzed and polymerized by an acid or basic catalyst may be used. As silicon alkoxide, silicon methoxide, silicon ethoxide, or their oligomer may be used. Hydrochloric acid, sulfuric acid, nitric acid, acetic acid, oxalic acid, trichloro acetic acid, trifluoro acetic acid, phosphoric acid, fluoric acid, formate acid, etc. may be used as an acid catalyst. Ammonia, amine group, etc. may be used as a basic catalyst. Metal oxide other than silicon, for example, titanium oxide, cerium oxide, bismuth oxide, aluminum oxide, zirconium oxide, etc. may be blended to silica to such a degree that the refractive index is not remarkably increased, in order to improve the mechanical strength of film, to improve the environment resisting property, or to adjust the refractive index. Super fine particles of silica, and such which fluorine is contained in silica or silica is made porous to further lower the refractive index may be employed.

Although an organic solvent used in the coating liquid composition used to form the abovementioned high refractive index film and low refractive index film depends on a coating method, methanol, ethanol, isopropanol, buthanol, hexanol, octanol, 2-methoxyethanol, 2-ethoxyethanol, 2-buthoxyethanol, cellosolve acetate, diethyleneglycol monoethylether, hexyleneglycol, diethyleneglycol, tripropyreneglycol, diacetone alcohol, etc. may be listed as an organic solvent. A coating liquid composition according to the invention may use the abovementioned solvents independently or in a plurality to adjust the viscosity, surface tension, etc. of the coating liquid. Furthermore, a bit of stabilizing agent, leveling agent, viscosity increasing agent, etc. may be added there to if necessary. Although the amount of use of solvent depends on a film thickness of a high refractive index film and lower refractive index film which are finally obtained, and a coating method to be employed, the amount of use of the solid content thereof is usually in a range from 1 to 20%.

The abovementioned coating liquid composition is coated onto a glass substrate by utilizing various kinds of the abovementioned coating methods. Thereafter, the coating liquid composition is dried for 5 to 120 minutes at a temperature from 100 to 300° C. in an acid atmosphere (in the air), and is burned for 1 to 100 minutes at a temperature from 500 to 800 C., thereby forming a high refractive index film or a low refractive index film. Although drying and burning are carried out independently for each of high refractive index film and low refractive index film to be laminated, the burning may be collectively carried out after the high refractive index film and low refractive index film are coated and dried. Furthermore, instead of the abovementioned heat drying at 100 to 300 C., the drying may be carried out by irradiating ultraviolet rays or visible light beams for 10 seconds to 10 minutes, or both of them may be concurrently used.

It is presumed that the reason why an optical thin film according to the invention has a ultraviolet ray absorbing performance is bondage of Ti—O—Ce. Furthermore, with respect to the reason why the refractive index is increased in a case where bismuth exists, it is considered that titanium and bismuth exist in a thin film in an independent or blended state of complex oxide $Ti_xBi_yO_z$ of titanium and bismuth, for example, bismuth titanate analog, titanium oxide $Ti_xO_z$ and bismuth oxide $Bi_yO_z$, or in a blended state with a crystal body or amorphous body, and it can be presumed that any one of these contributes to improvement of the refractive index.

By combining a high refractive index film and a low refractive index film according to the invention and laminating them on a usually non-colored glass substrate, ultraviolet ray absorbing non-colored glass substrate or ultraviolet ray absorbing colored glass substrate, it is possible to obtain ultraviolet ray absorbing and thermic ray reflecting glass having a visible light beam transmittance (Ya) more than 70%, a sunlight transmission (Tg) 60% or less, which is lower 15% than the visible light beam transmittance, and a ultraviolet ray transmittance less than 25% (according to ISO 9050, hereinafter, expressed in term of TUV (ISO)), without remarkably lowering the visible light beam transmittance of substrate glass and greatly changing the transmitting color and reflection color tone of the substrate glass. In particular, by using a colored glass plate having a ultraviolet ray transmittance TUV (ISO) which is 10% or less, and having a thickness from 2.0 to 5.0 mm as substrate glass, it is possible to obtain ultraviolet ray absorbing and thermic ray reflecting glass suitable for vehicle windows.

BEST MODE FOR CARRYING OUT THE INVENTION

Figure 1:
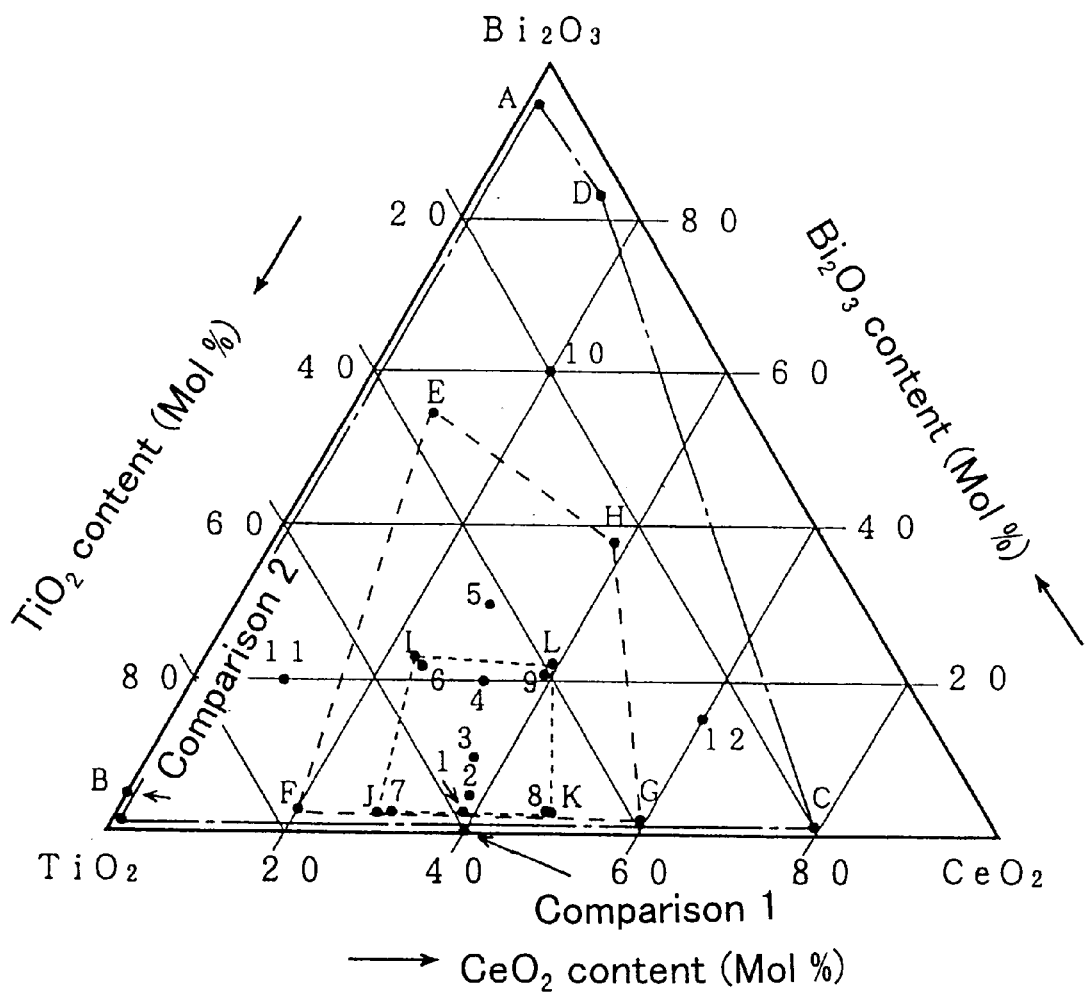
FIG. 1 is a graph showing a composition of optical thin film according to the invention.

Hereinafter, a preferred embodiment is shown, and a detailed description is given of the invention.

Embodiments 1 to 12, and Comparison Examples 1 to 2

Making of solution composition for forming a high refractive index film:

Nitric bismuth 5 hydrate (Bi material) of 24.9 g was blended with 2-ethoxyethanol of 118.2 g, tetraisopropoxy titanium (Ti material) of 170.7 g was added thereto, wherein they were agitated at 60° C. for three hours. After they were cooled to a room temperature, a liquid obtained by dissolving nitric cerium 6 hydrate (Ce material) of 173.4 g in 2-ethoxyethanol of 120 g was added thereto and they were agitated at a room temperature for one hour. Hereby, a solution composition for forming a high refractive index film, which corresponds to "A" solution of A1 in Table 1. The abovementioned three kinds of materials, Bi material, Ti material and Ce material are blended so as to become a composition ratio (mol ratio) in Table 1 by adjusting the amount of addition thereof, thereby causing 13 kinds of compositions, from A2 to A14, containing $TiO_2$—$CeO_2$—$Bi_2O_3$ to be adjusted. ("A" solution).

The abovementioned composition "A" solution was coated by a spin coating method onto a soda lime glass plate (thickness: 3.5 mm, visible light beam transmittance: 90%, sunlight beam transmittance: 84.7%, ultraviolet ray transmittance (wavelength 370 nm): 76.2%, refractive index: about 1.54 and 1.50 with respect to wavelengths 460 nm and 850 nm, respectively) ultrasonically treated in alkali water solution for five minutes and subsequently in pure water for five minutes. After the glass plate was dried at 250° C. for 1.5 hours, the plate was heated and burned in an electric hearth heated to 720° C. for two minutes. The films thus obtained is about 100 nm thick, and the refractive index (measurement wavelength, 370 nm, 550 nm, and 900 nm) and attenuation coefficient of the film itself (measurement wavelength: 370 nm) are shown in Table 1. Furthermore, the refractive index was measured by ellipsometry. The results of having observed the appearance of film by eyes are shown in Table 1, wherein a film having nothing abnormal was marked as "GOOD" and film having a crack was marked as "CRACK". On the basis of Table 1, if the amount of bismuth oxide is 2.5 or more percent when being converted to $Bi_2O_3$, it is clear that a high refractive index film will be formed, that is, the film has a refractive index of 2.20 or more for the measurement wavelength of 370 nm, 2.00 or more for the measurement wavelength of 550 nm, 1.96 or more for the measurement wavelength of 900 nm, and attenuation coefficient is 0.15 or more for 370 nm.

To the contrary, in a case where no bismuth oxide was provided, although the attenuation coefficient of 370 nm is equivalent to that in a case where bismuth oxide existed, the refractive index of the former was slightly smaller than that of the latter, and the film was cracked to cause the strength of the film to be lowered (Comparison example 1). Furthermore, in a case where no cerium oxide is provided, it is clear that the ultraviolet ray absorbing power is remarkably small (Comparison example 2). Furthermore, the optical characteristics were measured in compliance with Japanese Industrial Standard JIS Z 8722 for the visible light beam transmittance (Ya), JIS Z 8722 for the sunlight transmittance (Tg), and JIS R 3106 for the visible light beam reflection index (Ra: reflection index when with respect to entrance at 12 degrees). Furthermore, the compositions of optical films of the respect embodiments and comparison examples are plotted in a three-element composition graph on the basis of $TiO_2$—$CeO_2$—$Bi_2O_3$ in FIG. 1.

TABLE 1

| No. | "A" solution | Mol ratio (when converted to Mol % oxides) ($TiO_2$, $CeO_2$, $Bi_2O_3$) | Refractive index n (370 nm) | (550 nm) | (900 nm) | Attenuation coefficient k (370 nm) | Film appearance |
|---|---|---|---|---|---|---|---|
| Embodiment | | | | | | | |
| 1 | A1 | (58.5, 39, 2.5) | 2.26 | 2.03 | 1.96 | 0.19 | Good |
| 2 | A2 | (57, 38, 5) | 2.34 | 2.11 | 2.03 | 0.22 | Good |
| 3 | A3 | (54, 36, 10) | 2.36 | 2.13 | 2.05 | 0.19 | Good |
| 4 | A4 | (48, 32, 20) | 2.51 | 2.27 | 2.19 | 0.18 | Good |
| 5 | A5 | (42, 28, 30) | 2.52 | 2.28 | 2.20 | 0.17 | Good |
| 6 | A6 | (54, 24, 22) | 2.57 | 2.30 | 2.21 | 0.17 | Good |
| 7 | A7 | (67, 30, 3) | 2.60 | 2.35 | 2.26 | 0.17 | Good |
| 8 | A8 | (49, 48, 3) | 2.24 | 2.02 | 1.96 | 0.17 | Good |
| 9 | A9 | (40, 39, 21) | 2.38 | 2.13 | 2.05 | 0.17 | Good |
| 10 | A10 | (20, 20, 60) | 2.28 | 2.05 | 1.98 | 0.20 | Good |

TABLE 1-continued

| No. | "A" solution | Mol ratio (when converted to Mol % oxides) (TiO$_2$, CeO$_2$, Bi$_2$O$_3$) | Refractive index n (370 nm) | (550 nm) | (900 nm) | Attenuation coefficient k (370 nm) | Film appearance |
|---|---|---|---|---|---|---|---|
| 11 | A11 | (70, 10, 20) | 2.60 | 2.31 | 2.21 | 0.15 | Good |
| 12 | A12 | (25, 60, 15) | 2.20 | 2.00 | 1.97 | 0.19 | Good |
| Comparison example | | | | | | | |
| 1 | A13 | (60, 40, 0) | 2.19 | 1.99 | 1.95 | 0.19 | Crack |
| 2 | A14 | (95, 0, 5) | 2.68 | 2.37 | 2.28 | 0.018 | Good |

Embodiment 13 to 17 and Comparison Examples 3 to 4

Making of solution composition ("B" solution) for forming a low refractive index film:

Ethylsilicate (Colcoat, Ltd., [Ethyl silicate 40]) 150 g was blended with ethylcellosolve 132 g, and hydrochloric acid of 0.1 mol/L, 18 g, was added thereto. Thereafter, they were agitated at a room temperature for two hours. ("B" solution).

Embodiment 13

After a non-colored soda lime glass plate (3.5 mm thick, visible light beam transmittance: 89.3%, sunlight transmittance: 72.6%, ultraviolet ray transmittance (370 nm): 57.7%, ultraviolet ray transmittance (TUV (ISO)): 53.4%) was rinsed by the method described in embodiment 1, "A" solution of the abovementioned A4 was formed on one side of the surfaces of the glass plate by spin coating method, wherein the glass plate was dried at 250° C. for 1.5 hours to form the first layer film. Subsequently, the abovementioned "B" solution was coated on the corresponding first layer film. After the glass plate was dried at 250° C. for 1.5 hours, the same was heated and burned in an electric hearth heated to 500° C. for sixty minutes to make the second layer composed of silica. Furthermore, "A" solution which is the same as the abovementioned A4 was coated on the second layer, and the glass plate was dried and burned by the method described in embodiment 1 to make the third layer. Furthermore, the thickness of each layer was determined by a simulation calculation within a range where the transmitting color tone and reflecting color tone of the film-attached glass plate becomes nearly the same as those of the substrate, so that the sunlight transmittance is minimized. Still furthermore, the thickness of the respective layers in embodiments 14 to 16 and comparison examples 3, 4 were determined as well.

On the thermic ray reflecting glass plate thus obtained, the geometrical thickness of the first layer was 98 nm, that of the second layer was 151 nm, and that of the third layer was 90 nm, wherein the visible light beam transmittance was 79.4%, the sunlight transmittance was 58.6%, the transmittance for 370 nm was 21.0%, and TUV (ISO) was 19.4%. As regards the color tone, the transmitting color tone and reflecting color tone of the glass surface were the same as those of the substrate. Furthermore, the optical film thickness of the first, second and third layers was respectively 214.6 nm, 220.5 nm, and 197.1 nm when being calculated by using the values of the refractive index (2.19, 1.46 and 2.19) with respect to light of wavelength of 900 nm.

Embodiment 14

Embodiment 14 was prepared as in embodiment 13, except that a green soda lime glass plate (3.5 mm thick, visible light beam transmittance: 81.0%, sunlight transmittance: 60.8%, ultraviolet ray transmittance (370 nm): 52.6%, ultraviolet ray transmittance (TUV (ISO)): 31.4%) was used as a substrate. On the glass plate thus obtained, the geometrical thickness of the first layer was 109 nm, that of the second layer was 142 nm, and that of the third layer was 91.5 nm, wherein the visible light beam transmittance was 72.1%, the sunlight transmittance was 43.8%, the transmittance for 370 nm was 14.6%, and TUV (ISO) was 8.7%. As regards the color tone, both the transmitting color tone and reflecting color tone of the glass surface were the same as those of the substrate.

Embodiment 15

Embodiment 15 was prepared as in embodiment 13, except that a bronze-colored soda lime glass plate (3.5 mm thick, visible light beam transmittance: 79.3%, sunlight transmittance: 72.68%, ultraviolet ray transmittance (370 nm): 57.7%, ultraviolet ray transmittance (TUV (ISO)): 38.2%) was used as substrate. On the glass plate thus obtained, the geometrical thickness of the first layer was 98 nm, that of the second layer was 148 nm, and that of the third layer was 95 nm, wherein the visible light beam transmittance was 72.2%, the sunlight transmittance was52.1%, the transmittance for 370 nm was 16.6%, and TUV (ISO) was 9.8%. As regards the color tone, both the transmitting color tone and reflecting color tone of the glass surface were the same as those of the substrate.

Embodiment 16

Embodiment 16 was prepared as in embodiment 13, except that a green glass (3.5 mm thick, visible light beam transmittance: 72.8%, sunlight transmittance: 48.8%, ultraviolet ray transmittance (370 nm): 26.9%, ultraviolet ray transmittance (TUV (ISO)): 9.5%) having ultraviolet ray absorbing power was used as a substrate. As regards the film-attached glass plate thus obtained, the transmittance for 370 nm was 6.8%, TUV (ISO) was 3.4%, the visible light beam transmittance was 72.2%, and the sunlight transmittance 37.6%. and the color tones in transmittance and reflection was the same as those of the substrate.

Embodiment 17

Embodiment 17 was prepared as in embodiment 13, except that a bronze-colored glass (3.5 mm thick, visible light beam transmittance: 73.9%, sunlight transmittance: 65.3%, ultraviolet ray transmittance (370 nm): 29.7%, ultraviolet ray transmittance (TUV (ISO)): 9.6%) having ultraviolet ray absorbing power was used as a substrate. As regards the film-attached glass plate thus obtained, the transmittance for 370 nm was 7.4%, TUV (ISO) was 3.7%, the visible light beam transmittance was 72.0%, and the sunlight transmittance 49.4%. and the color tones in transmittance and reflection was the same as those of the substrate.

From embodiments 13 to 17, by providing each kind of glass substrates with a coated film consisting of three layers, it is possible to obtain ultraviolet ray absorbing and thermic ray reflecting glass having a high thermic reflecting performance, especially film-attached glass having a sunlight transmittance of 60% or less and value (visible light beam transmittance—sunlight transmittance) of 15% or more, and a ultraviolet ray transmittance (TUV(ISO)) of 25% or less with the visible light beam transmittance maintained at a high value, especially 70% or more. Furthermore, in a case where the values of the visible light beam transmittance, sunlight transmittance and ultraviolet ray transmittance (TUV(ISO)) of a glass substrate are respectively defined to be Ya1, Tg1, Tuv1, the values of the visible light beam transmittance, sunlight transmittance and ultraviolet ray transmittance (TUV(ISO)) of the abovementioned film-attached glass plate are respectively defined to be Ya2, Tg2 and Tuv2, and the visible light beam transmittance, sunlight transmittance and ultraviolet ray transmittance of the three-layered film itself are respectively defined to be (Ya2/Ya1), (Tg2/Tg1) and (Tuv2/Tuv1), in embodiments 13 to 17, a three-layered film can be obtained, which has a performance of (Ya2/Ya1) 90% or more, (Tg2/Tg1) 82% or less and (Tuv2/Tuv1) 40% or less.

Comparison Example 3

Comparison example 3 was prepared as in embodiment 13, except that "A" solution of A13 which was used in comparison example 1 was used instead of "A" solution of A4 used in embodiment 13. On the ultraviolet ray absorbing glass thus obtained, the geometrical thickness of the first layer was 123 nm, that of the second layer was 159 nm, and that of the third layer was 109 nm, wherein the ultraviolet ray transmittance was 28.6% for a wavelength of 370 nm of the film-attached glass obtained, TUV(ISO) was 25.5%, and the visible light beam transmittance was 75.0%. Furthermore, the sunlight transmittance was 66.7%, and the value of (Tg2/Tg1) was 91.9%, wherein the thermic ray shielding power was inferior to embodiment 13 in which [the sunlight transmittance was 58.6% and the value of (Tg2/Tg1) was 80.7%]. The color tones in transmission and reflection were almost the same as those of the substrate.

Comparison Example 4

Comparison example 4 was prepared as in embodiment 13, except that "A" solution of A14 which was used in comparison example 2 was used instead of "A" solution of A4 used in embodiment 13. The visible light beam transmittance of the film-attached glass thus obtained was 78.4% and the sunlight transmittance thereof was 60.1%. Furthermore, the transmittance for 370 nm was 54.3%, TUV(ISO) was 50.6%, and the value of (Tuv2/Tuv1) was 94.8%. Comparison example 4 was remarkably inferior in the ultraviolet ray absorbing performance to embodiment 13 in which [TUV(ISO) was 19.4% and the value of (Tuv2/Tuv1) was 36.3%]. The color tones in transmission and reflection were almost the same as those of the substrate.

As been described in a detailed description of the invention, with the present invention, it is possible to provide a high refractive index film having a very high refractive index and to provide ultraviolet absorbing and thermic ray reflecting glass having a high thermic reflecting performance with the visible light beam transmittance maintained at a high value.

INDUSTRIAL FEASIBILITY

As been described as above, glass according to the invention is suitable for optical materials such as ultraviolet ray absorbing and thermic ray reflecting glass.

What is claimed is:

1. An optical thin film containing titanium oxide, cerium oxide, and bismuth oxide, wherein the content ratio of said titanium oxide, cerium oxide, and bismuth oxide is within the area expressed by a four-cornered shape ABCD consisting of A (4,1,95), B (98,1,1), C (20,79,1), and D (3,14,83) in terms of coordinate points ($TiO_2$ mol percent, $CeO_2$ mol percent, and $Bi_2O_3$ mol percent) of the mol ratio.

2. An optical thin film as set forth in claim 1, wherein the content ratio of said titanium oxide, cerium oxide, and bismuth oxide is within the area expressed by a four-cornered shape EFGH consisting of E (36,9,55), F (77,20,3), G (39,59,2), and H (24,38,38) in terms of coordinate points ($TiO_2$ mol percent, $CeO_2$ mol percent, and $Bi_2O_3$ mol percent) of the mol ratio.

3. An optical thin film as set forth in claim 1, wherein the content ratio of said titanium oxide, cerium oxide, and bismuth oxide is within the area expressed by a four-cornered shape IJKL consisting of I (54,23,23), J (68,29,3), K (49,48.5,2), and L (39,39,22) in terms of coordinate points ($TiO_2$, mol percent, $CeO_2$ mol percent, and $Bi_2O_3$ mol percent) of the mol ratio.

4. An optical thin film as set forth in claim 1, which is obtained by coating on a substrate a solution containing a titanium compound consisting of titanium alkoxide, titanium alkoxide chloride, or titanium chelate; a cerium compound consisting of cerium inorganic salt or cerium alkoxide; and a bismuth compound consisting of bismuth inorganic salt or bismuth alkoxide, and by heating the same at 400 to 800° C.

5. A composition for forming an optical thin film obtained by blending a titanium compound, a cerium compound and a bismuth compound with an organic solution and dissolving the same therein.

6. A composition for forming an optical thin film as set forth in claim 5, wherein said titanium compound, cerium compound, and bismuth compound are blended and dissolved at a ratio within the area expressed by a four-cornered shape ABCD consisting of A (4,1,95), B (98,1,1), C (20,79, 1), and D (3,14,83) in terms of coordinate points ($TiO_2$ mol percent, $CeO_2$ mol percent, and $Bi_2O_3$ mol percent) of the mol ratio.

7. Ultraviolet ray absorbing and thermal ray reflecting glass, wherein a comparatively high refractive index film layer and a comparatively low refractive index film layer are alternately laminated at least three layers on a transparent glass substrate in total, at least two layers of said three layers are comparatively high refractive index films, and at least one layer of said comparatively high refractive index films is an optical thin film described in claim 1.

8. Ultraviolet ray absorbing and thermal ray reflecting glass as set forth in claim 7, wherein said comparatively high refractive index film has an optical thickness from 170 nm to 500 nm.

9. Ultraviolet ray absorbing and thermal ray reflecting glass as set forth in claim 7, wherein said comparatively low refractive index film has a refractive index of 1.6 or less and has an optical thin film having a thickness from 170 nm to 500 nm.

10. Ultraviolet ray absorbing and thermal ray reflecting glass as set forth in claim 7, wherein said transparent substrate is a colored glass plate having a thickness from 2.00 mm to 5.00 mm and an ultraviolet ray transmittance (TUV(ISO)) of 10% or less.

11. An optical thin film consisting essentially of titanium oxide, cerium oxide, and bismuth oxide.

12. The optical thin film as set forth in claim 11, which is obtained by coating on a substrate a solution containing a titanium compound consisting of titanium alkoxide, titanium alkoxide chloride, or titanium chelate; a cerium compound consisting of cerium inorganic salt or cerium alkoxide; and a bismuth compound consisting of bismuth inorganic salt or bismuth alkoxide, and by heating the same at 400° to 800° C.

* * * * *